US012719195B2

(12) United States Patent
Geng et al.

(10) Patent No.: US 12,719,195 B2
(45) Date of Patent: Aug. 25, 2026

(54) CONNECTOR AND ELECTRONIC DEVICE

(71) Applicant: Huawei Technologies Co., Ltd., Shenzhen (CN)

(72) Inventors: Yonghong Geng, Shanghai (CN); Hua Deng, Chengdu (CN); Jianjun Zhou, Shanghai (CN); Xuezhong Zhang, Chengdu (CN); Yungui Qian, Shanghai (CN); Guojie Zhao, Chengdu (CN); Qiang Fu, Chengdu (CN); Zhigang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 18/696,684

(22) PCT Filed: Aug. 11, 2022

(86) PCT No.: PCT/CN2022/111911
§ 371 (c)(1),
(2) Date: Mar. 28, 2024

(87) PCT Pub. No.: WO2023/051055
PCT Pub. Date: Apr. 6, 2023

(65) Prior Publication Data

US 2024/0396245 A1 Nov. 28, 2024

(30) Foreign Application Priority Data

Sep. 29, 2021 (CN) .......................... 202111152625.6

(51) Int. Cl.
*H01R 13/24* (2006.01)
*H01R 12/57* (2011.01)
*H01R 13/03* (2006.01)

(52) U.S. Cl.
CPC ......... *H01R 13/2414* (2013.01); *H01R 12/57* (2013.01); *H01R 13/03* (2013.01)

(58) Field of Classification Search
CPC .... H01R 13/2414; H01R 12/57; H01R 13/03; H01B 1/02; H01B 1/04; B82Y 30/00
See application file for complete search history.

(56) References Cited

U.S. PATENT DOCUMENTS

| | | | | |
|---|---|---|---|---|
| 8,952,258 | B2 * | 2/2015 | Plucinski | H01R 12/55 977/734 |
| 9,236,669 | B2 * | 1/2016 | Mann | H01B 1/24 |
| 2011/0039459 | A1 * | 2/2011 | Yancey | H05K 3/325 174/128.1 |

FOREIGN PATENT DOCUMENTS

| | | | |
|---|---|---|---|
| CN | 103106950 | A | 5/2013 |
| CN | 111087678 | A | 5/2020 |
| CN | 111200195 | A | 5/2020 |
| CN | 111782078 | A | 10/2020 |
| JP | 2008014942 | A | 1/2008 |

* cited by examiner

*Primary Examiner* — Edwin A. Leon
(74) *Attorney, Agent, or Firm* — Conley Rose, P.C.

(57) ABSTRACT

A connector includes an elastic foam core and a wrapping layer. An interior of the elastic foam core includes a plurality of foam pores. The wrapping layer wraps a periphery of the elastic foam core, and the wrapping layer includes at least one nanowire layer. The connector can be included in an electronic device.

20 Claims, 6 Drawing Sheets

02

30

CONNECTOR AND ELECTRONIC DEVICE

CROSS-REFERENCE TO RELATED APPLICATIONS

This is a National Stage of International Patent Application No. PCT/CN2022/111911, filed on Aug. 11, 2022, which claims priority to Chinese Patent Application No. 202111152625.6, filed on Sep. 29, 2021. Both of the aforementioned applications are hereby incorporated by reference in their entireties.

TECHNICAL FIELD

This application relates to the field of conductive technologies, and in particular, to a connector and an electronic device.

BACKGROUND

A conductive foam is a kind of connector with excellent elasticity, has conductive and anti-static effect, effect of reducing electromagnetic radiation, and the like, and is widely used in various electric electronic devices.

For example, the electronic device is a terminal device. With diversified forms of the terminal device, for example, appearance of structures such as a folded-form terminal, a scrollable terminal, and a flexible wearable terminal, an electrical connection scenario of the terminal device is increasingly complex. Compared with a conventional flat-plane-display or curved-screen terminal device, a future terminal device develops in a direction such as small operation space, a small bounce force required for a flexible connection, or a dynamic grounding scenario. Therefore, characteristics such as low impedance, a small bounce force, high rebound, and a large operation range are required for an electrical connection to the future terminal device. In addition, to meet a radio frequency harmonic index, a low harmonic characteristic is further required.

However, in a conventional technology, a spring solution, a fabric-over-foam (fabric-over-foam, FOF) foam solution, a foam-pore-punching foam solution, an all-round foam solution, and the like cannot meet comprehensive requirements for low impedance, a small bounce force, low harmonic, high rebound, and a large operation range at the same time.

SUMMARY

Embodiments of this application provide a connector and an electronic device, to resolve a problem that an existing connector cannot have a plurality of performances at the same time.

To achieve the foregoing objective, the following technical solutions are applied in this application.

According to a first aspect of embodiments of this application, a connector is provided and includes: an elastic foam core, where an interior of the elastic foam core includes a plurality of foam pores; and a wrapping layer, wrapping a periphery of the elastic foam core, where the wrapping layer includes at least one nanowire layer.

In embodiments of this application, the elastic foam core in the connector is made of a material with a low density and high porosity like polyurethane (polyurethane, PU), polypropylene (polypropylene, PP), polyethylene (polyethylene, PE), silica gel, or rubber, so that the elastic foam core has characteristics of a small bounce force and high rebound. In addition, no hot-melt adhesive layer needs to be disposed in the connector, and a size of the connector may be small, so that the connector can be applicable to an electronic device with large space, and also can be applicable to an electronic device with small space, and the elastic foam core has a wide operation range. In addition, the wrapping layer in the connector includes the nanowire layer and/or a graphene layer, and replaces a structure of a plated metal layer formed by using an existing electroplating process. The nanowire layer and the graphene layer have specific flexibility and toughness, and can deform with the elastic foam core, to prevent the wrapping layer from breaking, so that the connector has characteristics of low impedance and low harmonic, and problems of large impedance and large harmonic are resolved. In addition, in a case in which the wrapping layer in the connector includes a plurality of nanowire layers and/or graphene layers, nanowire layers made of different materials may be disposed based on different requirements, to expand an application scope.

In some embodiments, the wrapping layer includes a plurality of nanowire layers, and materials of the plurality of nanowire layers are not completely the same. The material of the nanowire layer is properly selected, so that some of nanowire layers have a good conductive performance, and some of nanowire layers have other characteristics. The connector can have a solderability characteristic or a salt spray resistance characteristic on the basis of a conductive characteristic, and meet different use requirements.

In some embodiments, densities of nanowires in the nanowire layers gradually increase in a direction away from the elastic foam core. For example, the wrapping layer may be disposed to be of a structure in which bottom nanowires are sparse and surface nanowires are dense. The bottom nanowires are sparsely disposed, so that costs can be reduced. In addition, the surface nanowires are dense, and the surface nanowires can block the foam pore, and prevent an adhesive like a pressure-sensitive adhesive from overflowing into the foam pore, to resolve a problem that adhesive overflowing in compression causes a bounce force to deteriorate in actual use.

In some embodiments, a material of a nanowire layer closest to the elastic foam core includes silver. Because a silver nanowire layer has good toughness and conductivity, the nanowire layer closest to the elastic foam core is disposed as the silver nanowire layer, so that the wrapping layer has good conductivity and toughness.

In some embodiments, a material of a nanowire layer located at an outermost layer includes nickel. Because a nickel nanowire layer has a good salt spray resistance characteristic, the nanowire layer farthest away from the elastic foam core is disposed as the nickel nanowire layer, so that the connector has a salt spray resistance characteristic and is applicable to a requirement in a special environment.

In some embodiments, the connector further includes a soldering layer, and the soldering layer is in contact with and connected to the wrapping layer. Although nickel has a good salt spray resistance characteristic, nickel has a poor solderability performance. Therefore, in embodiments of this application, the soldering layer in contact with and connected to the wrapping layer is disposed at a needed location on the wrapping layer (for example, a location at which the wrapping layer is in contact with and connected to a first component or a second component), so that the connector has a salt spray resistance characteristic and a solderability characteristic. This expands an application scope of the connector.

In some embodiments, a material of a nanowire layer located at an outermost layer includes copper or tin. Because a copper nanowire layer or a tin nanowire layer has good conductive and solderability performances, the nanowire layer farthest away from the elastic foam core is disposed as the copper nanowire layer or the tin nanowire layer, so that the connector further has a solderability performance on the basis of a conductive performance. The connector can be used in a surface-amount technology.

In some embodiments, each of the plurality of nanowire layers includes a single conductive material. A material of each nanowire layer is disposed to be a single material (a material type is one), and a preparation process of the nanowire layer is simple and the nanowire layer is easy to prepare.

In some embodiments, in the nanowire layer, a diameter of the nanowire is within an interval range of 30 nm to 120 nm. The diameter of the nanowire is limited within the interval range of 30 nm to 120 nm, so that the nanowire has characteristics of high rebound, low impedance, and low harmonic.

In some embodiments, a thickness of the wrapping layer is within an interval range of 50 nm to 500 nm. The thickness of the wrapping layer is limited within the interval range of 50 nm to 500 nm, so that the connector has characteristics of a large variable range of operation space, high rebound, low impedance, and low harmonic.

In some embodiments, the connector further includes an inner nanowire layer covering a surface of the foam pore. The inner nanowire layer can improve the conductive performance of the connector.

In some embodiments, the nanowire in the nanowire layer includes a metallic nanowire. The metallic nanowire is a common nanowire structure, a preparation process is mature, and preparation costs of the connector are low.

In some embodiments, the nanowire in the nanowire layer includes a non-metallic nanowire. The non-metallic nanowire is also a possible implementation.

In some embodiments, the nanowire in the nanowire layer includes at least one of the following: a carbon nanowire, a ferrite nanowire, or a piezoelectric ceramic nanowire. The carbon nanowire can enable the connector to have a conductive characteristic, the ferrite nanowire can enable the connector to have wave-absorbing and electromagnetic-wave-shielding characteristics, and the piezoelectric ceramic nanowire can enable the connector to have an electromagnetic safety protection characteristic.

In some embodiments, the interior of the elastic foam core is sponge-shaped. The sponge-shaped elastic foam core has characteristics of a low density and high porosity, so that the elastic foam core has characteristics of a small bounce force and high rebound.

According to a second aspect of embodiments of this application, an electronic device is provided and includes the connector according to any one of the first aspect, a first component, and a second component, where the connector is disposed between the first component and the second component, and is electrically connected to each of the first component and the second component.

The electronic device provided in embodiments of this application includes the connector according to the first aspect, and beneficial effects of the electronic device are the same as beneficial effects of the connector. Details are not described herein again.

In some embodiments, the first component is a printed circuit board. The connector serves as a BTB (board to board) connector in the electronic device.

In some embodiments, the first component is a reference ground. The connector serves as a grounding connector in the electronic device.

In some embodiments, the reference ground includes a middle frame and/or a metal rear cover. The middle frame or the metal rear cover is a common reference ground in the electronic device. The connector is electrically connected to the middle frame or the metal rear cover, to implement grounding of the second component. A structure is simple.

DESCRIPTION OF EMBODIMENTS

Figure 1:
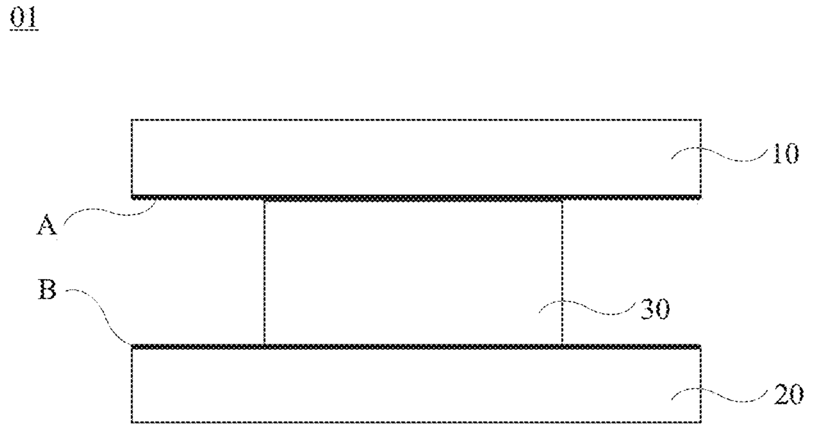
FIG. 1 is a schematic diagram of a structure of an electrical connection assembly according to an embodiment of this application.

The following describes the technical solutions in embodiments of this application with reference to the accompanying drawings in embodiments of this application. It is clear that the described embodiments are merely a part rather than all of embodiments of this application.

Terms such as “first”, “second”, and the like mentioned below in embodiments of this application are merely used for ease of description, and shall not be understood as an indication or implication of relative importance or implicit indication of a quantity of indicated technical features. Therefore, a feature limited by “first”, “second” and the like may explicitly indicate or implicitly include one or more such features. In description of this application, unless otherwise stated, “a plurality of” means two or more than two.

In embodiments of this application, “up”, “down”, “left”, and “right” are not limited to definitions relative to directions in which components are schematically placed in the accompanying drawings. It should be understood that these directional terms may be relative concepts used for relative description and clarification, and may change correspondingly based on a change in a direction in which a component is placed in the accompanying drawings.

In embodiments of this application, unless otherwise specified in the context, in the entire specification and claims, the term “include” is interpreted as “open and inclusive”, that is, “includes, but is not limited to”. In the descriptions of this specification, terms such as “an embodiment”, “some embodiments”, “example embodiments”, “an example”, “some examples”, or the like are intended to indicate that specific features, structures, materials, or characteristics related to embodiments or examples are included in at least one embodiment or example of the present disclosure. The foregoing schematic representations of the terms do not necessarily refer to a same embodiment or example. Further, the particular features, structures, materials, or characteristics may be included in any one or more embodiments or examples in any appropriate manner.

When some embodiments are described, expressions of “coupling” and “connection” and extensions thereof may be used. For example, when some embodiments are described, the term “connection” may be used to indicate that two or more components are in direct physical contact or electrical contact with each other. For another example, when some embodiments are described, the term “coupling” may be used to indicate that two or more components are in direct physical contact or electrical contact. However, the term “coupling” may also indicate that two or more components are not in direct contact with each other, but still collaborate or interact with each other. Embodiments disclosed herein are not necessarily limited to content of this specification.

The term “and/or” in embodiments of this application describes only an association relationship between associated objects and represents that three relationships may exist. For example, A and/or B may represent the following three cases: Only A exists, both A and B exist, and only B exists. In addition, the character “/” in this specification generally indicates an “or” relationship between the associated objects.

In embodiments of this application, an example implementation is described with reference to a sectional view and/or a plane diagram and/or an equivalent circuit diagram that are/is used as idealized example accompanying drawings. In the accompanying drawings, for clarity, thicknesses of layers and regions are increased. Thus, a change in a shape that is in the accompanying drawings and that is caused by, for example, manufacturing techniques and/or tolerances may be envisaged. Therefore, example implementations should not be construed as being limited to a shape of a region shown in this specification, but rather include shape deviations caused by, for example, manufacturing. For example, an etching region shown as a rectangle typically has a bending characteristic. Therefore, the regions shown in the accompanying drawings are essentially examples, and shapes thereof are not intended to show actual shapes of regions of a device, and are not intended to limit the scope of the example implementations.

Some embodiments of this application provide an electrical connection assembly. As shown in FIG. 1, the electrical connection assembly 01 includes a first component 10 and a second component 20. The first component 10 has a first conductive surface A, the second component 20 has a second conductive surface B, and the first conductive surface A and the second conductive surface B are disposed opposite to each other. The first component 10 is electrically connected to the second component 20 by using a connector 30. In other words, the first component 10 is electrically connected to the second component 20 by using the connector 30.

Some embodiments of this application further provide an electronic device. The electrical connection assembly 01 may be used in the electronic device. When the electrical connection assembly 01 is used in the electronic device, the first component 10 and the second component 20 may be of any structure that needs to be electrically connected in the electronic device. A specific form of the electronic device is not specially limited in embodiments of this application, and all devices having an electrical signal flow inside belong to the electronic device provided in embodiments of this application.

The electronic device may also be referred to as user equipment (user equipment, UE for short), an access terminal, a subscriber unit, a subscriber station, a mobile station, a remote station, a remote terminal, a mobile device, a user terminal, a wireless communication device, a user agent, or a user apparatus.

The electronic device may be a mobile station (mobile station, MS for short), a subscriber unit (subscriber unit), an internet of things (Internet of Things, IoT for short) device, a station (station, ST for short) in a wireless local area network (wireless local area network, WLAN for short), a cellular phone (cellular phone), a smartphone (smartphone), a cordless phone, an e-reader, a remote control, a television, a tablet computer, a watch, a headset, a session initiation protocol (session initiation protocol, SIP for short) phone, a wireless local loop (wireless local loop, WLL for short) station, a personal digital assistant (personal digital assistant, PDA) device, a laptop computer (laptop computer), a machine type communication (machine type communication, MTC for short) terminal, a handheld device with a wireless communication function, a computing device, or another processing device, in-vehicle device, network television, or wearable device (which may also be referred to as a wearable intelligent device) that is connected to a wireless modem.

Figure 2A:
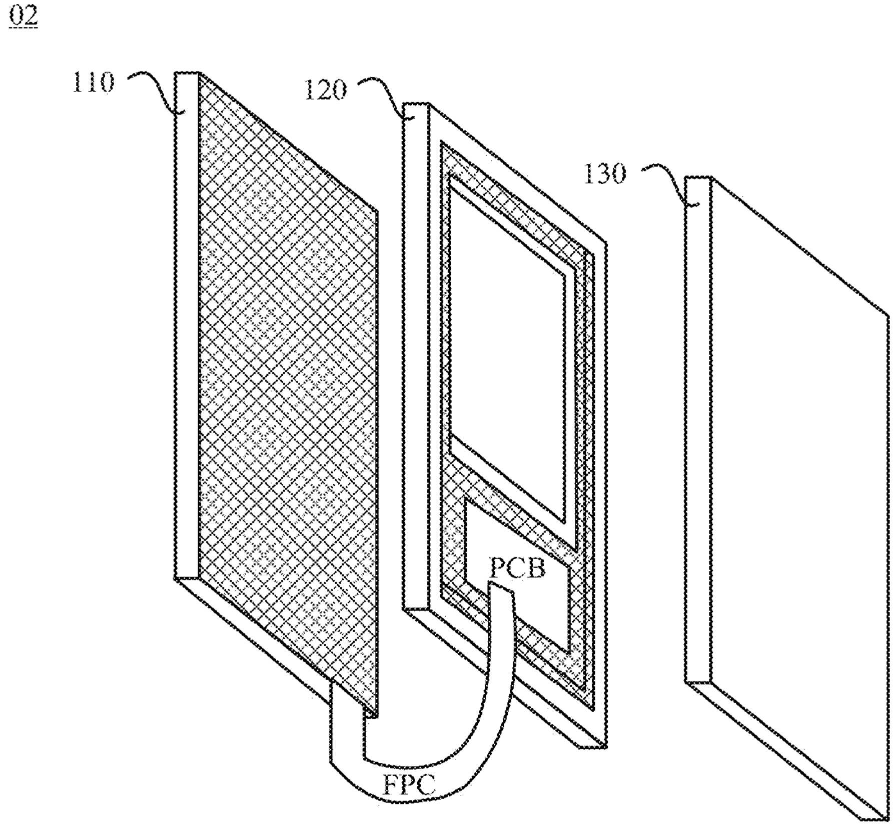
FIG. 2A is a schematic diagram of a framework of an electronic device according to an embodiment of this application.

For example, the electronic device is a mobile phone. As shown in FIG. 2A, the electronic device 02 mainly includes, a display assembly 110, a middle frame 120, and a rear cover 130. The display assembly 110 and the middle frame 120 are disposed in the rear cover 130.

The middle frame 120 is located between the display assembly 110 and the rear cover 130. As shown in FIG. 2A, the middle frame 120 is configured to install internal components such as a mainboard, a battery, a camera (camera) module, and an antenna. The mainboard may be, for example, a PCB (Printed Circuit Board). The mainboard is configured to provide an electrical signal for the display assembly 110, and the display assembly 110 is electrically connected to the mainboard by using a flexible printed circuit (flexible printed circuit. FPC).

The display assembly 110 may include a display and a touch panel disposed on a light-emitting side of the display.

The display may be, for example, a liquid crystal display (liquid crystal display, LCD). In this case, the display assembly 110 further includes a backlight source disposed on a back of the display, and the backlight source is configured to provide a light source for the display.

The display may alternatively be, for example, an organic light-emitting diode (organic light-emitting diode, OLED) display.

The OLED display may be any one of a flat-plane display, a flexible display, a curved screen, a foldable screen, and a scrollable screen.

The electronic device 02 includes the electrical connection assembly 01. In a case in which the connector 30 in the electrical connection assembly 01 is configured to electrically interconnect the first component 10 and the second component 20 in the electronic device 02, the first component 10 may be a PCB, and the second component 20 may be an FPC. In this case, the connector 30 is equivalent to a board-to-board (board-to-board, BTB) connector.

Figure 2B:
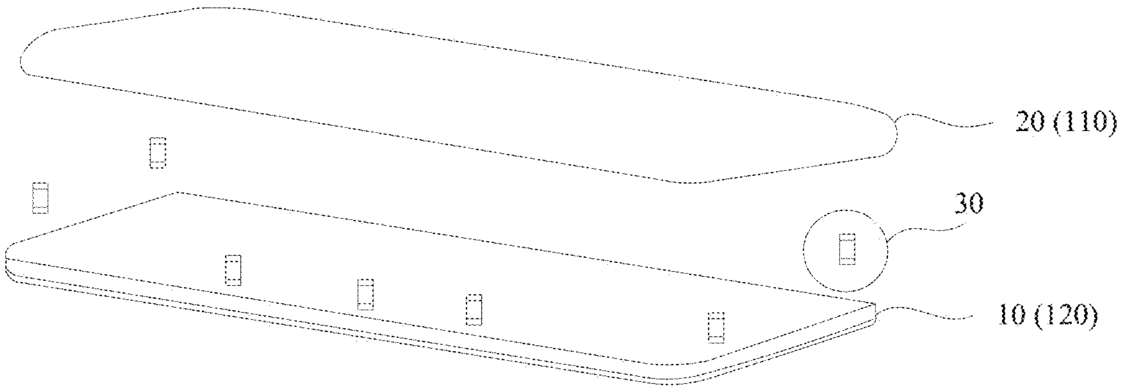
FIG. 2B is a schematic diagram of a structure of another electrical connection assembly according to an embodiment of this application.

In a case in which the connector 30 in the electrical connection assembly 01 is configured to connect the second component 20 in the electronic device 02 to a reference ground, the first component 10 in the electrical connection assembly 01 is the reference ground, and is configured to provide a grounding connection point. The second component 20 is a camera module, an antenna, a chip, or the display assembly 110 shown in FIG. 2B. The reference ground may be, for example, the middle frame 120, or the rear cover 130 made of a metal material (or referred to as a metal rear cover or a metal back cover).

Based on this, an embodiment of this application further provides a display assembly. In addition to the display assembly 110, the display assembly further includes the connector 30, and the display assembly 110 is electrically connected to the connector 30.

An embodiment of this application further provides a camera assembly, including a camera module and the connector 30. The camera module is electrically connected to the connector 30.

An embodiment of this application further provides an antenna assembly, including an antenna and the connector 30, and the antenna is electrically connected to the connector 30.

An embodiment of this application further provides a chip assembly, including a chip and the connector 30, and a shielding cover of the chip is electrically connected to the connector 30.

A manner of connection between the connector 30 and each of the display assembly 110, the camera module, and the antenna is not limited in embodiments of this application. For example, the connection may be a fixed connection (for example, soldering or bonding), or may be a detachable connection (for example, a buckle connection), and the two may only be electrically connected.

Figure 3A:
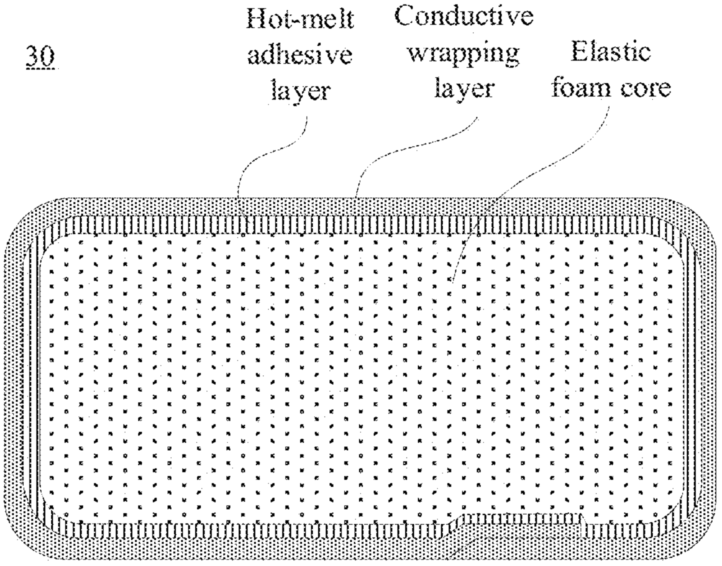
FIG. 3A is a schematic diagram of a structure of a connector according to an embodiment of this application.

For a structure of the connector 30, in some embodiments, as shown in FIG. 3A, the connector 30 may be, for example, a conductive fabric-over-foam (fabric-over-foam, FOF) foam.

As shown in FIG. 3A, the connector 30 includes an elastic foam core and a conductive wrapping layer wrapping a periphery of the elastic foam core, and the elastic foam core is connected to the conductive wrapping layer by using a hot-melt adhesive layer.

The conductive wrapping layer may be a nickel-plated conductive fabric, a gold-plated conductive fabric, a tin-plated polyimide (polyimide, PI) film, a nickel-plated PI film, a gold-plated PI film, or the like.

Figure 3B:
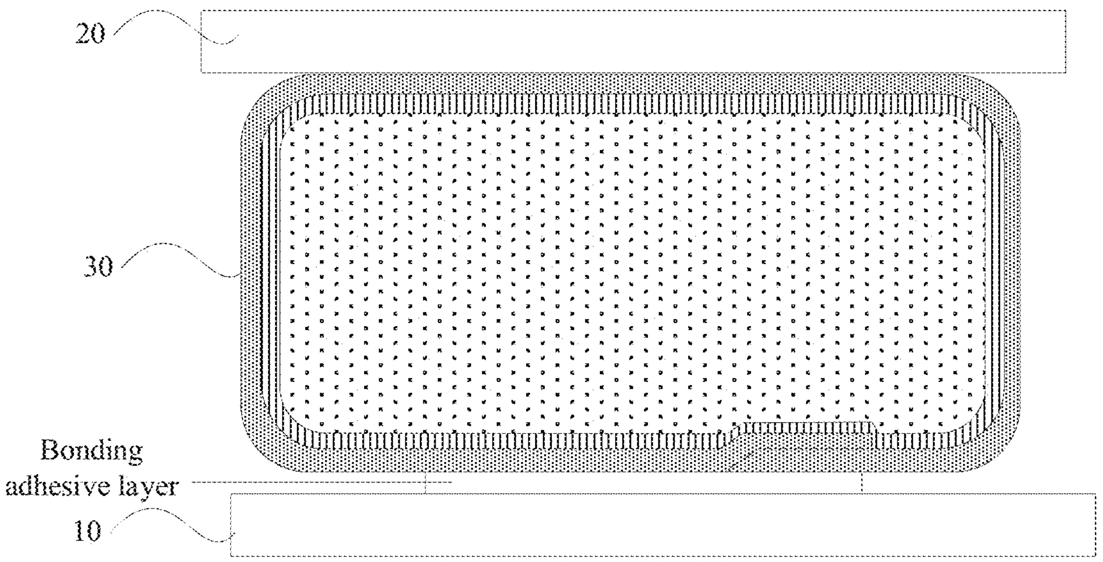
FIG. 3B is a schematic diagram of a structure of still another electrical connection assembly according to an embodiment of this application.

In some embodiments, to improve wrapping effect of the conductive wrapping layer, as shown in FIG. 3A, two ends of the conductive wrapping layer are overlapped, to reduce a risk of cracking of the conductive wrapping layer. The elastic foam core is dented at a location at which the two ends of the conductive wrapping layer are overlapped. As shown in FIG. 3B, a first component 10 and a second component 20 are respectively disposed on two opposite sides of the connector 30. In some embodiments, the first component 10 may be bonded to the connector 30 by using a bonding adhesive layer (pressure-sensitive conductive adhesive or insulation adhesive). In some embodiments, the second component 20 may also be bonded to the connector 30 by using a bonding adhesive layer (pressure-sensitive conductive adhesive or insulation adhesive). In some other embodiments, the second component 20 may alternatively be directly in contact with and connected to the connector 30. It should be understood that the bonding adhesive layer should not affect electrical connections between the first component 10 and the connector 30 and between the second component 20 and the connector 30.

The connector 30 shown in FIG. 3A has a simple structure and a long service life. However, generally, minimum thicknesses of the conductive wrapping layer and the hot-melt adhesive layer are respectively 0.05 mm and 0.05 mm, and the conductive wrapping layer and the hot-melt adhesive layer are incompressible layers. As a result, in a compression process of the connector 30, a bounce force of the connector 30 increases rapidly, especially in a small space scenario. For example, for the connector 30 whose natural height is 1.0 mm, a thickness of the incompressible conductive wrapping layer is 0.05*2=0.1 mm (a sum of thicknesses of upper and lower sides), and a thickness of the hot-melt adhesive layer is 0.05*2=0.1 mm (a sum of thicknesses of upper and lower sides). When the connector 30 is compressed to 0.5 mm, an actual compression amount of the elastic foam core is 1−(0.5−0.1−0.1)/(1.0−0.1−0.1)=0.625 mm, and a compression amount of the elastic foam core without the conductive wrapping layer and the hot-melt adhesive layer is 0.5 mm. In other words, existence of the conductive wrapping layer and the hot-melt adhesive layer causes an increase in the compression amount of the elastic foam core. Consequently, the bounce force of the connector 30 increases, and a requirement for a small bounce force cannot be met.

In addition, the existence of the conductive wrapping layer and the hot-melt adhesive layer causes a small size of the connector 30. This cannot meet a requirement in a quite small space scenario.

In addition, because the elastic foam core of the conductive FOF foam is a foam core of an open foam pore structure, when the conductive FOF foam is compressed to an extreme extent, a problem that the hot-melt adhesive layer and a pressure-sensitive adhesive layer overflow into the elastic foam core easily occurs. Consequently, the elastic foam core rebounds less or does not rebound, and a requirement for high rebound (or understood as super softness) cannot be met.

Figure 3C:
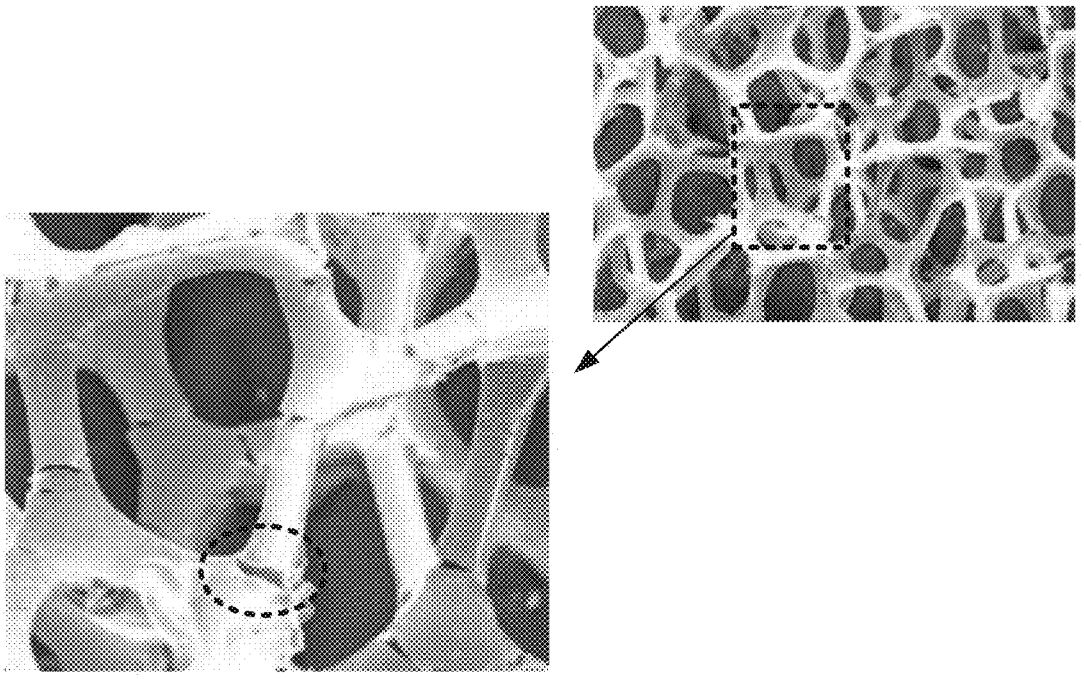
FIG. 3C is a partial schematic diagram of a connector according to an embodiment of this application.

In another possible embodiment, the connector 30 includes an elastic foam core and a metal layer attached to a surface of the elastic foam core. As shown in FIG. 3C, the elastic foam core is of a three-dimensional meshed bubble structure, and metallization processing is performed through electroplating, to form the metal layer on a meshed surface of the foam core.

In this structure, because the elastic foam core is of a three-dimensional meshed open foam pore structure, a bounce force of the elastic foam core increases slowly with an increase of a deformation amount, so that the connector 30 has a small bounce force.

However, because toughness of the metal layer on the surface is poor, in a compression process of the three-dimensional meshed elastic foam core (which may also be referred to as an all-round foam), the metal layer cannot deform synchronously with the three-dimensional meshed elastic foam core. Consequently, the metal layer is prone to breaking (as shown in a region circled by a dotted ellipse in FIG. 3C). As a result, impedance of the connector 30 deteriorates, and high harmonic is generated.

Based on this, an embodiment of this application further provides a connector 30 having characteristics of low impedance, low harmonic, a small bounce force, high rebound, and a large operation range.

The following uses several detailed examples to describe the connector 30 provided in embodiments of this application.

Example 1

Figure 4:
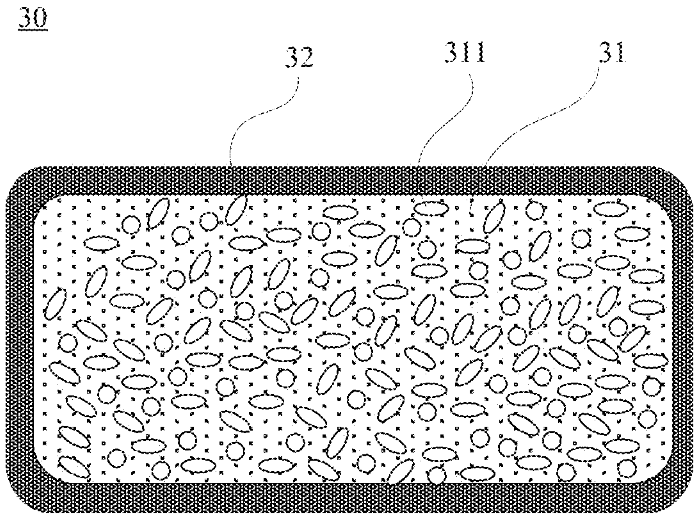
FIG. 4 is a schematic diagram of a structure of another connector according to an embodiment of this application.

As shown in FIG. 4 (a sectional view of the connector 30), the connector 30 includes an elastic foam core 31 and a wrapping layer 32.

For a structure of the elastic foam core 31, as shown in FIG. 4, an interior of the elastic foam core 31 includes a plurality of foam pores 311.

The elastic foam core 31 may be an elastic foam core with an open pore, or may be an elastic foam core with a closed pore.

It should be explained that the elastic foam core with a closed pore means that all closed foam pores in the elastic foam core are complete foam pores, but the foam pores are surrounded by pore walls, and air and moisture cannot enter the interior of the foam. In contrast, the elastic foam core with an open pore allows air to flow between the foam pores.

It should be noted herein that the elastic foam core 31 is an elastic foam core with an open pore, and all foam pores 311 in the elastic foam core 31 may be open pores. However, there is no limitation that all foam pores 311 in the elastic foam core 31 shall be open pores. Alternatively, a part of foam pores 311 are open pores, and a part of foam pores 311 are closed pores.

For example, the interior of the elastic foam core 31 may be understood to be sponge-shaped or honeycomb-shaped. The sponge-shaped or honeycomb-shaped elastic foam core 31 has characteristics of a low density and high porosity, so that the elastic foam core 31 has characteristics of a small bounce force and high rebound.

It should be noted that an extension track of the foam pore 311 in the elastic foam core 31 is not limited. The extension track of the foam pore 311 in the elastic foam core 31 may be a straight line, for example, a hole in a honeycomb briquette. The extension track of the foam pore 311 in the elastic foam core 31 may alternatively be a regular or an irregular broken line, for example, a hole in a wasp nest.

In addition, a shape of the foam pore 311 in the elastic foam core 31 is not limited. The foam pore 311 may be in a circular shape, an elliptical shape, or any other shape.

A material of the elastic foam core 31 may be, for example, polyurethane (polyurethane, PU), polypropylene (polypropylene, PP), polyethylene (polyethylene, PE), a non-foamed elastic rubber material, or a foamed silica gel material.

The wrapping layer 32 in the connector 30 wraps a periphery of the elastic foam core 31.

Figure 5:
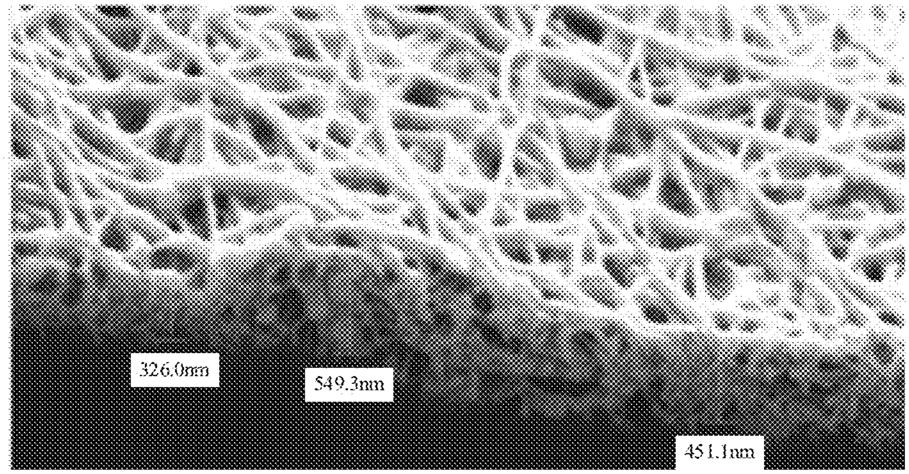
FIG. 5 is a schematic diagram of a structure of a wrapping layer according to an embodiment of this application.

For a structure of the wrapping layer 32, as shown in FIG. 5, the wrapping layer 32 includes at least one nanowire layer.

The nanowire layer may be understood as a conductive film layer obtained by coating and curing a suspension liquid prepared by using a nanowire solution and a solvent. A plurality of nanowire layers may be obtained through a plurality of times of coating and curing.

A material of the nanowire layer may be any conductive material. For example, a material of each nanowire layer may include at least one of materials such as carbon, silver, nickel, copper, and tin.

Because nickel and silver have a good salt spray resistance (or understood as corrosion resistance) characteristic, copper and tin have a good conductive characteristic, and carbon is light, the material of the nanowire layer may be selected based on different requirements, so that the wrapping layer 32 has a good conductive characteristic or a good salt spray resistance characteristic.

For example, the material of the single nanowire layer may include any one of materials such as silver, nickel, copper, and tin. In other words, each nanowire layer includes a single conductive material (one type of conductive material).

In some embodiments, each nanowire layer includes one type of conductive material.

In this case, the nanowire solution for preparing the nanowire layer includes only one type of conductive material, and such a nanowire layer preparation process is simple.

A case in which the wrapping layer 32 includes a plurality of nanowire layers, and each nanowire layer includes only one type of conductive material is as follows.

Figure 6A:
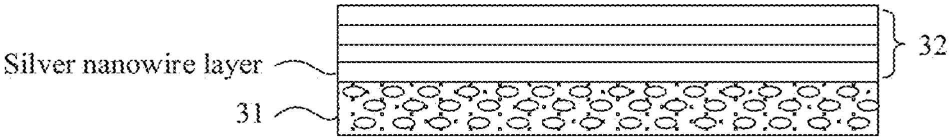
FIG. 6A is a schematic diagram of a structure of a nanowire layer according to an embodiment of this application.

In some embodiments, as shown in FIG. 6A, materials of the plurality of nanowire layers in the wrapping layer 32 are completely the same.

For example, as shown in FIG. 6A, a material of each nanowire layer is silver, and the plurality of nanowire layers are all silver nanowire layers. Certainly, the material of the nanowire layer in FIG. 6A is merely an example, and does not impose any limitation.

Figure 6B:
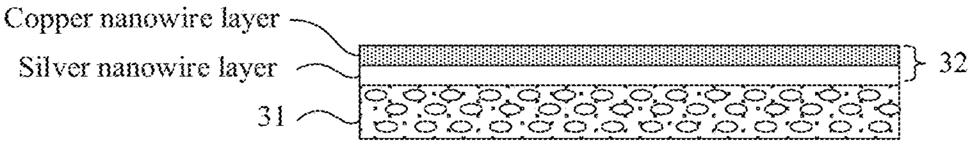
FIG. 6B is a schematic diagram of a structure of another nanowire layer according to an embodiment of this application.

In some other embodiments, as shown in FIG. 6B, materials of the plurality of nanowire layers in the wrapping layer 32 are different.

For example, as shown in FIG. 6B, the materials of the plurality of nanowire layers are silver and copper. The plurality of nanowire layers are a silver nanowire layer and a copper nanowire layer.

Certainly, the plurality of nanowire layers are not limited to two layers, and may be more layers. FIG. 6B is merely an example.

Figure 6C:
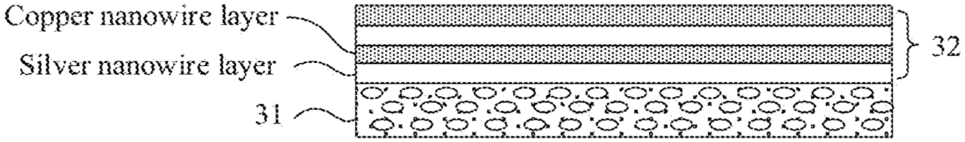
FIG. 6C is a schematic diagram of a structure of still another nanowire layer according to an embodiment of this application.

In some other embodiments, as shown in FIG. 6C, in the plurality of nanowire layers in the wrapping layer 32, some of nanowire layers have a same material.

For example, as shown in FIG. 6C, materials of the plurality of nanowire layers are silver, copper, silver, and copper that are alternately arranged.

For example, the plurality of nanowire layers are a silver nanowire layer, a copper nanowire layer, a silver nanowire layer, and a copper nanowire layer that are alternately arranged.

In other words, materials of the nanowire layers on both sides of the copper nanowire layer are the same, and both are silver nanowire layers. Materials of the nanowire layers on both sides of the silver nanowire layer are the same, and both are copper nanowire layers. That is, nanowire layers having the same material may be nanowire layers that are spaced.

Certainly, in embodiments of this application, a quantity of silver nanowire layers and copper nanowire layers that are alternately arranged is not limited. Alternatively, the wrapping layer 32 may be six nanowire layers, namely, a silver nanowire layer, a copper nanowire layer, a silver nanowire layer, a copper nanowire layer, a silver nanowire layer, and a copper nanowire layer that are alternately arranged. Certainly, these are merely examples, and do not impose any limitation.

Figure 6D:
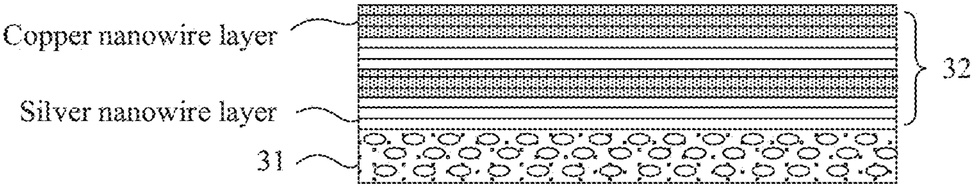
FIG. 6D is a schematic diagram of a structure of still another nanowire layer according to an embodiment of this application.

Alternatively, for example, as shown in FIG. 6D, materials of the plurality of nanowire layers are silver, silver, silver, copper, copper, copper, silver, silver, silver, copper, copper, and copper that are alternately arranged.

For example, the plurality of nanowire layers are a silver nanowire layer, a silver nanowire layer, a silver nanowire layer, a copper nanowire layer, a copper nanowire layer, a copper nanowire layer, a copper nanowire layer, a silver nanowire layer, a silver nanowire layer, a silver nanowire layer, a copper nanowire layer, a copper nanowire layer, and a copper nanowire layer that are alternately arranged.

In other words, nanowire layers having the same material may be adjacent nanowire layers.

Certainly, in embodiments of this application, a quantity of stacked nanowire layers whose materials are the same is not limited. Although FIG. 6D shows that materials of three stacked nanowire layers are the same, materials of two stacked nanowire layers may be the same, or materials of a plurality of stacked nanowire layers such as four layers or five layers are the same.

It should be noted above that if the plurality of stacked nanowire layers whose materials are the same have same characteristics (for example, densities of nanowires, diameters of nanowires, or length-to-diameter ratios of nanowires), or in other words, the plurality of stacked nanowire layers are prepared by using a same nanowire solution, it cannot be seen that adjacent nanowire layers are clearly layered, and for visual effect, there is a nanowire layer. If the characteristics of the plurality of nanowire layers are not completely the same, it can be seen that the adjacent nanowire layers are layered.

In addition, the wrapping layers 32 shown in FIG. 6A to FIG. 6D merely use the silver nanowire layer and the copper nanowire layer as examples to illustrate an arrangement manner of the nanowire layers in the wrapping layer 32, and do not impose any limitation. The silver nanowire layer and the copper nanowire layer may alternatively be nanowire layers made of another material.

Because a silver nanowire has good toughness and a good conductive performance, in some embodiments, as shown in FIG. 6A to FIG. 6D, a material of a nanowire layer closest to the elastic foam core 31 includes silver.

For example, the nanowire layer closest to the elastic foam core 31 is a silver nanowire layer.

The silver nanowire layer has good toughness and conductivity. The nanowire layer closest to the elastic foam core 31 is disposed as the silver nanowire layer, so that the wrapping layer 32 has good conductivity and toughness.

Because a copper nanowire and a tin nanowire have good conductive performances, in some embodiments, a material of a nanowire layer (namely, a nanowire layer located at an outermost layer) farthest away from the elastic foam core 31 includes copper or tin.

For example, the nanowire layer farthest away from the elastic foam core 31 is a copper nanowire layer or a tin nanowire layer.

The copper nanowire layer and the tin nanowire layer have good conductive and solderability performances. The nanowire layer farthest away from the elastic foam core 31 is disposed as the copper nanowire layer or the tin nanowire layer, so that the connector 30 further has a solderability performance on the basis of a conductive performance. This enables the connector 30 to be used in a surface-mount technology (surface-mount technology, SMT).

It should be understood that when the connector 30 is used in a soldering scenario, the wrapping layer 32 in the connector 30 should be made of a material that resists a high soldering temperature.

Because nickel has a good salt spray resistance (or understood as corrosion resistance) characteristic, in some embodiments, a material of a nanowire layer (namely, a nanowire layer located at an outermost layer) farthest away from the elastic foam core 31 includes nickel.

For example, the nanowire layer farthest away from the elastic foam core 31 is a nickel nanowire layer.

Because nickel has a good salt spray resistance characteristic, the nanowire layer at the outermost layer is disposed as the nickel nanowire layer, so that the connector 30 has a salt spray resistance characteristic and is applicable to a requirement in a special environment.

In some other embodiments, each nanowire layer may include a plurality of types of conductive materials.

In this case, the nanowire solution for preparing the nanowire layer includes a plurality of types of conductive materials, and such a nanowire layer may be compatible with a plurality of functions such as a conductive function and an anti-corrosion function.

A case in which the wrapping layer 32 includes a plurality of nanowire layers, and each nanowire layer includes a plurality of types of conductive materials is as follows.

In some embodiments, materials of the plurality of nanowire layers in the wrapping layer 32 are completely the same.

Because each nanowire layer includes the plurality of types of conductive materials, that only all types of conductive materials in a nanowire layer are the same as those in another nanowire layer means that the materials of the nanowire layers are the same.

In some other embodiments, materials of the plurality of nanowire layers in the wrapping layer 32 are different.

Because each nanowire layer includes the plurality of types of conductive materials, that even one type of conductive material in a nanowire layer is different from that in another nanowire layer means that the materials of the nanowire layers are different. For example, a copper-silver nanowire layer and a copper-tin nanowire layer are two nanowire layers made of different materials.

In some other embodiments, in the plurality of nanowire layers in the wrapping layer 32, some of nanowire layers have a same material.

Nanowire layers having the same material may be adjacent nanowire layers, or may be nanowire layers that are spaced.

The nanowire in the nanowire layer included in the wrapping layer 32 is a metallic nanowire, and the formed wrapping layer 32 is a conductive layer, so that the connector 30 has a conductive characteristic and may be used as an electrical connector.

In some embodiments, the nanowire in the nanowire layer included in the wrapping layer 32 is a non-metallic nanowire.

For example, the nanowire in the nanowire layer included in the wrapping layer 32 includes a carbon nanowire.

The carbon nanowire may be a solid nanowire, or the carbon nanowire may be a hollow nanowire. Herein, the hollow carbon nanowire may also be referred to as a nanotube.

The carbon nanowire is also a nanowire having a conductive performance, the wrapping layer 32 includes the carbon nanowire, and the formed wrapping layer 32 is a conductive layer, so that the connector 30 has a conductive characteristic and may be used as an electrical connector.

Alternatively, for example, the nanowire in the nanowire layer included in the wrapping layer 32 includes a ferrite nanowire.

The wrapping layer 32 may include one or more layers of ferrite nanowires, and further include one or more layers of other nanowires. Alternatively, the wrapping layer 32 may include one or more layers of ferrite nanowires.

The wrapping layer 32 includes the ferrite nanowire, so that the connector 30 has wave-absorbing and electromagnetic-wave-shielding characteristics.

Alternatively, for example, the nanowire in the nanowire layer included in the wrapping layer 32 includes a piezoelectric ceramic nanowire.

The wrapping layer 32 may include one or more layers of piezoelectric ceramic nanowires, and further include one or more layers of other nanowires. Alternatively, the wrapping layer 32 may include one or more layers of piezoelectric ceramic nanowires.

The wrapping layer 32 includes the piezoelectric ceramic nanowire, so that the connector 30 has an electromagnetic safety protection characteristic.

In some embodiments, the wrapping layer 32 includes at least one graphene layer.

For example, the wrapping layer 32 includes one or more graphene layers. Alternatively, for example, the wrapping layer 32 includes at least one of the foregoing nanowire layers and at least one graphene layer, and the graphene layer and the nanowire layer are alternately used.

The graphene layer also has a conductive performance, the wrapping layer 32 includes the graphene layer, and the formed wrapping layer 32 is a conductive layer, so that the connector 30 has a conductive characteristic and may be used as an electrical connector.

In some embodiments, densities of nanowires in the nanowire layers gradually increase in a direction away from the elastic foam core 31.

To be specific, a density of the nanowire layer on the surface of the elastic foam core 31 is small, then densities of the nanowire layers formed in sequence gradually increase, and a density of the nanowire layer at the outermost layer is the largest.

It should be noted that, that the densities of the nanowire layers gradually increase is not limited to that the density of each nanowire layer is greater than the density of the nanowire layer below the nanowire layer, provided that the densities are in an overall increasing trend.

For example, a ratio of the nanowire solution to the solvent is adjusted, so that the density of the nanowire layer may be adjusted. A higher ratio of the nanowire solution indicates a greater density of the nanowire in the nanowire layer.

It should be noted that, that the wrapping layer 32 wraps a periphery of the elastic foam core 31 means that each surface of the elastic foam core 31 is covered with the wrapping layer 32. In other words, a surface that is of an end face and on which the foam pore 311 is located is also covered with the wrapping layer 32. Alternatively, it is understood that an opening of the foam pore 311 is also covered by the wrapping layer 32.

For example, the wrapping layer 32 may be disposed to be of a structure in which bottom nanowires are sparse and surface nanowires are dense. The bottom nanowires are sparsely disposed, so that costs can be reduced. In addition, the surface nanowires are dense, and the surface nanowires can block the foam pore 311, and prevent an adhesive like a pressure-sensitive adhesive from overflowing into the foam pore 311, to resolve a problem that adhesive overflowing in compression causes a bounce force to deteriorate in actual use.

In some embodiments, in the nanowire layer, a diameter of the nanowire is within an interval range of 30 nm to 120 nm.

For example, the diameter of the nanowire is 40 nm, 50 nm, 60 nm, 70 nm, 80 nm, 90 nm, 100 nm, or 110 nm.

An excessively large diameter of the nanowire affects bounce of the elastic foam core 31. This affects a high rebound characteristic of the connector 30. An excessively small diameter of the nanowire affects conductivity of the wrapping layer 32. This affects low impedance and low harmonic characteristics of the connector 30. Based on this, in embodiments of this application, the diameter of the nanowire is limited within the interval range of 30 nm to 120 nm, so that the nanowire has characteristics of high rebound, low impedance, and low harmonic.

In some embodiments, a thickness of the wrapping layer 32 is within an interval range of 50 nm to 500 nm.

For example, the thickness of the wrapping layer 32 is 100 nm, 150 nm, 200 nm, 250 nm, 300 nm, 350 nm, 400 nm, or 450 nm.

An excessively large thickness of the wrapping layer 32 increases a size of the connector 30. This affects characteristics that are a large variable range of operation space and high rebound and that are of the connector 30. An excessively small thickness of the wrapping layer 32 affects conductivity of the wrapping layer 32. This affects low impedance and low harmonic characteristics of the connector 30. Based on this, in embodiments of this application, the thickness of the wrapping layer 32 is limited within the interval range of 50 nm to 500 nm, so that the connector 30 has characteristics of a large variable range of operation space, high rebound, low impedance, and low harmonic.

It should be understood that, as shown in FIG. 5, thicknesses of the wrapping layer 32 that includes the plurality of nanowire layers are not necessarily equal.

Figure 7:
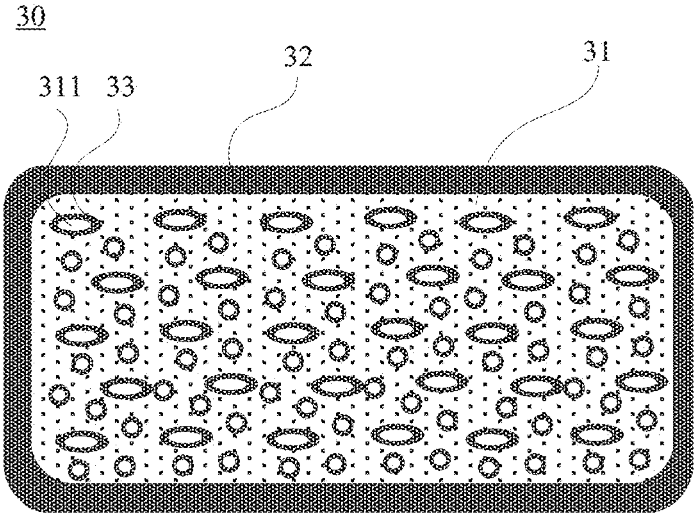
FIG. 7 is a schematic diagram of a structure of still another connector according to an embodiment of this application.

In some embodiments, as shown in FIG. 7, the connector 30 further includes an inner nanowire layer 33, and the inner nanowire layer 33 covers a surface of the foam pore 311 in the elastic foam core 31.

For a structure of the inner nanowire layer 33, refer to the foregoing descriptions of the nanowire layer in the wrapping layer 32. Details are not described herein again.

A quantity of nanowire layers in the inner nanowire layer 33 is not limited in embodiments of this application. The inner nanowire layer 33 is formed on the surface of the foam pore 311, so that conductivity of the connector 30 can be improved. However, too many layers of the inner nanowire layer 33 affect a rebound force of the foam pore 311.

Therefore, in some embodiments, the inner nanowire layer 33 is a single nanowire layer. For example, the inner nanowire layer 33 may be formed synchronously with the first nanowire layer in the wrapping layer 32. For example, a manner of forming the wrapping layer 32 and the inner nanowire layer 33 is as follows.

A hyperbranched polyurethane fiber (HBPUF) suspension solvent (dendritic molecule) and the nanowire solution (NW) are mixed to obtain an NW/HDPUF suspension; the suspension is dropwise added on the elastic foam core 31, the nanowires are enriched on a dendritic molecule surface, and a layer of uniform nanowires is formed on the surface of the foam pore 311 and the surface of the elastic foam core 31 by using water absorption and expansion characteristics of the elastic foam core 31 of an open-pore structure, and then curing is performed, to form a first nanowire layer in the inner nanowire layer 33 and the wrapping layer 32, so that the elastic foam core 31 has a conductive function; the suspension is dropped on the surface of the foam pore 311 and the elastic foam core 31 that is covered with the nanowire layer on an outer surface, and curing is performed, to form the nanowire layer only on the surface of the elastic foam core 31, and the plurality of nanowire layers are formed after a plurality of times of dropwise addition and coating, to obtain the wrapping layer 32.

In embodiments of this application, the elastic foam core 31 in the connector 30 is made of a material with a low density and high porosity like PU. PE, PP, silica gel, or rubber, so that the elastic foam core 31 has characteristics of a small bounce force and high rebound. In addition, no hot-melt adhesive layer needs to be disposed in the connector 30, and a size of the connector 30 may be small, so that the connector 30 can be applicable to an electronic device with large space, and also can be applicable to an electronic device with small space, and the elastic foam core 31 has a wide operation range. In addition, the wrapping layer 32 in the connector 30 includes the nanowire layer and/or the graphene layer, and replaces a structure of a plated metal layer formed by using an existing electroplating process. The nanowire layer and the graphene layer have specific flexibility and toughness, and can deform with the elastic foam core 31, to prevent the wrapping layer 32 from breaking, so that the connector 30 has characteristics of low impedance and low harmonic, and problems of large impedance and large harmonic are resolved.

In addition, the wrapping layer 32 in the connector 30 includes a plurality of nanowire layers and/or graphene layers. The material of the nanowire layer is properly selected, so that the connector 30 has a solderability characteristic on the basis of a conductive characteristic, and meets different use requirements. In addition, the density of the nanowire in the surface nanowire layer is adjusted, so that an adhesive like a pressure-sensitive adhesive does not overflow, and a problem that adhesive overflowing in compression causes a bounce force to deteriorate in actual use is resolved.

Example 2

A main difference between example 2 and example 1 lies in that on the basis of the structure in example 1, the connector 30 further includes a soldering layer 34.

Figure 8:
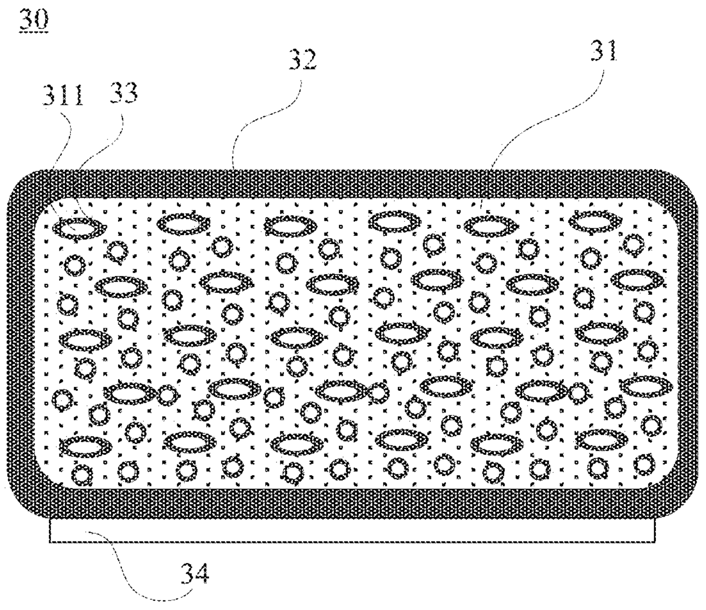
FIG. 8 is a schematic diagram of a structure of still another connector according to an embodiment of this application.

In some embodiments, as shown in FIG. 8, the connector 30 further includes a soldering layer 34, and the soldering layer 34 is in contact with and connected to the wrapping layer 32.

A material, for example, nickel, included in the nanowire layer has a good salt spray resistance characteristic or another characteristic, but does not have a good solderability performance. Therefore, if a material of a nanowire layer that is in the wrapping layer 32 and that is farthest away from the elastic foam core 31 includes nickel, the connector 30 cannot have both a salt spray resistance characteristic and a solderability characteristic.

Based on this, in embodiments of this application, the soldering layer 34 that is in contact with and connected to the wrapping layer 32 is disposed at a needed location on the wrapping layer 32 (for example, a location at which the wrapping layer 32 is in contact with and connected to the first component 10 or the second component 20), and the wrapping layer 32 may be in contact with and connected to the first component 10 or the second component 20 by using the soldering layer 34, so that the connector 30 has a conductive characteristic, a salt spray resistance characteristic, and a solderability characteristic. This expands an application scope of the connector 30.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device comprising:
a first component;
a second component; and
a connector disposed between the first component and the second component, electrically connected to each of the first component and the second component, and comprising:
an elastic foam core comprising:
a periphery; and
an interior comprising a plurality of foam pores; and
a wrapping layer wrapping the periphery and comprising one or more nanowire layers.

2. The electronic device according to of claim 1, wherein the one or more nanowire layers comprises a plurality of nanowire layers, and wherein the plurality of nanowire layers comprises at least two different materials.

3. The electronic device of claim 1, wherein densities of nanowires in the one or more nanowire layers gradually increase in a direction away from the elastic foam core.

4. The electronic device of claim 1, wherein a nanowire layer of the one or more nanowire layers that is closest to the elastic foam core comprises silver.

5. The electronic device of claim 1, wherein a nanowire layer of the one or more nanowire layers that is located at an outermost layer comprises nickel.

6. The electronic device of claim 1, wherein the connector further comprises a soldering layer in contact with and connected to the wrapping layer.

7. The electronic device of claim 1, wherein a nanowire layer of the one or more nanowire layers that is located at an outermost layer comprises copper or tin.

8. The electronic device of claim 1, wherein each of the one or more nanowire layers comprises a single conductive material.

9. The electronic device of claim 1, wherein a diameter of one or more nanowires in the one or more nanowire layers is within a range of 30 nanometers (nm) to 120 nm.

10. The electronic device of claim 1, wherein a thickness of the wrapping layer is within a range of 50 nm to 500 nm.

11. The electronic device of claim 1, wherein the connector further comprises an inner nanowire layer covering a surface of a foam pore.

12. The electronic device of claim 1, wherein the one or more nanowire layers comprises a metallic nanowire.

13. The electronic device of claim 1, wherein the one or more nanowire layers comprises a non-metallic nanowire.

14. The electronic device of claim 13, wherein the one or more nanowire layers comprises at least one of a carbon nanowire, a ferrite nanowire, or a piezoelectric ceramic nanowire.

15. The electronic device of claim 1, wherein the interior comprises a material having a low density and a high porosity.

16. The electronic device of claim 1, wherein the first component is a printed circuit board or the first component is a reference ground.

17. The electronic device of claim 1, wherein the first component is a reference ground comprising a middle frame and/or a metal rear cover.

18. An electronic device comprising:

a first component;

a second component; and a connector disposed between the first component and the second component, electrically connected to each of the first component and the second component, and comprising:

an elastic foam core comprising:

a periphery; and an interior comprising a plurality of foam pores; and a wrapping layer wrapping the periphery of the elastic foam core, wherein the wrapping layer comprises one or more graphene layers.

19. The electronic device of claim 18, wherein the wrapping layer comprises at least one of a carbon nanowire, a ferrite nanowire, or a piezoelectric ceramic nanowire.

20. The electronic device of claim 18, wherein the wrapping layer comprises one or more nanotubes.

* * * * *